Patented Jan. 14, 1941

2,228,514

UNITED STATES PATENT OFFICE 2,228,514

ANION EXCHANGING RESIN

Robert Griessbach, Wolfen, Kreis Bitterfeld, Hans Wassenegger and Karl Brodersen, Dessau in Anhalt, Alfred Rieche, Wolfen, Kreis Bitterfeld, and Hans Maier-Bode, Dessau in Anhalt, Germany, assignors to I. G. Farbenindustrie Aktiengesellschaft, Frankfort-on-the-Main, Germany No Drawing. Application May 6, 1937, Serial No. 141,090. In Germany May 9, 1936

7 Claims. (Cl. 260—59)

Our present invention relates to new products useful for removing anions from dilute aqueous solutions. More particularly it relates to artificial resins obtainable by condensation of aromatic amines with aldehydes or their equivalents.

Another object of our invention is the improved process for removing anions from aqueous solutions with the aid of such basic amine resins.

A further object of the invention is the production of the said resins.

Additional objects of our invention are the new resins having a distinct improved capacity for binding anions.

Further objects of our invention will be seen from the detailed specification following hereafter.

It is known practice to produce, by condensation of primary aromatic amines with aldehydes, resins which bind anions in a form capable of exchange. When such exchange bodies, which may likewise be made from aminophenols and ketones, organic dihalides or the like, are used for the purpose of purifying water or the like, particularly for removing salt from water; in the latter case the constituents must generally be removed from very dilute solutions, the disadvantage arises that only a relatively small fraction of the high binding capacity of these resins for acids can be utilized, when extensive or complete removal of the undesired anions, for example SO4'' and Cl' is desired. Furthermore, in the regeneration these bodies have the disadvantage that repeated treatment with alkaline liquids and consequently a great excess of the latter is necessary in order to remove the bound acid constituents.

This invention is based on the observation that exchange substances having considerably better properties are obtained when organic bases of stronger basic character are introduced into the aforementioned resins. This may be done in various manners. For example, an amine-resin exchange body of known make may be strengthened in respect of its basic character by after-treatment with an alkylating agent. As parent material there is used, for instance, a meta-phenylene-diamine-resin and this may be subsequently alkylated, for example with methylchloride or diethyl-sulfate. Also the alkylation of an intermediate product, such as is produced, for example, if condensation is conducted with a proportion of formaldehyde insufficient for the formation of resin, sometimes offers advantages. By the selection of special operative conditions, such as temperature, pressure, duration and number of treatments, it is possible for the alkylation to be continued as far as the quaternary base.

It is also possible to bring into the condensation a substance having strong basic properties. With this object there may be used as parent material aromatic substances containing tertiary amines or quaternary ammonium bases, which in conjunction with substances containing amino- or phenolic groups can react with aldehydes or substances reacting as aldehydes under the conditions of resin formation. As quaternary compounds there come into question particularly bases of mixed aliphatic-aromatic character.

By reason of the strengthened alkaline character such resins can withdraw greater quantities of anions from solutions than can the simple condensation products obtained, for instance, by condensation of metaphenylene-diamine, aniline or other primary amines with formaldehyde.

Furthermore, by our present invention an increased effect is obtained by using an artificial resin produced by causing the amino group of the aromatic base to react, before or after the condensation with an aldehyde, as a whole or in part, with a substance containing a cyano-group linked to a nitrogen atom, such as, for example, cyanamide (dicyandiamide) or guanidine cyanide. It is obvious that the amino group is added to the cyano group in the following manner

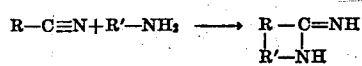

wherein R stands for amino or a substituted aminoradicle and R' for an aromatic radicle.

The reaction is carried out in the simplest manner by heating the salt, for example the hydrochloride, of the resin with an aqueous solution of the cyano-compound, evaporating the solution to dryness, and if desired after-heating the residue.

Finally, an increase in the action of such resins is obtained by treating the amine for producing the resin, or the exchange resin produced, with an aliphatic compound which in its turn either already possesses basic groups or receives a basic group by subsequent replacement of a reactive atom or group in the alkyl radicle. Such compounds are, for example, ethylene-imine, N-dimethyl-chlorethylamine ((CH₃)₂N.CH₂.CH₂·Cl), epichlorhydrin, or the like. Instead of applying this treatment to basic exchange-resins one may apply it to resins which are of weak acid character, for example phenol resins, which thus undergo an alteration from a cation exchanger to an anion exchanger.

The following examples illustrate the invention, the parts being by weight; parts by volume bear the same ratio to parts by weight that the liter bears to the kilo:

Example 1.—30.9 parts of meta-phenylene-diamine are dissolved while stirring in 22.5 parts by volume of hydrochloric acid of 32 per cent. strength and 15 parts by volume of water. After cooling to room temperature by the addition of 15 parts of ice, the whole is cooled to below 0° C. Correspondingly, 59 parts of formaldehyde solution of 30 per cent. strength are likewise cooled to below 0° C. by the addition of 15 parts of broken ice. While stirring briskly the second solution is tipped into the first. After further vigorous stirring for about 1 minute the stirrer is removed. The temperature rises gradually and then progressively quickly to 60° C. After 4 to 5 minutes the mass solidifies to a homogeneous gel. After standing over night the resin is broken into coarse pieces and hardened in a drying chest at 70 to 80° C.

The resin is then introduced, while hot, into cold water, wherein it decrepitates into small pieces. After washing, which may be assisted by the use of hot water, and after thorough treatment with alkali lye, the resin may of itself be used as an anion-exchanger. 45 parts of resin are obtained.

Now according to this invention, the hardened and comminuted resin is introduced into an equal weight of dimethyl sulfate and the whole is then heated for 8 to 10 hours in a water bath. Then the easily swollen resin is separated, on a suction filter, from excess dimethyl sulfate and covered with methanol. The dried product is treated in known manner with alkali lye and is then ready for use for exchange purposes; it differs from the non-methylated product by higher reactivity which is manifested by a more complete removal of the anions and also by a higher regeneration capacity.

Equal quantities by volume of the two non-methylated and methylated resins produced as described above were filled into filters and then used for the removal of SO₄″ and Cl′. There was used a water treated with a hydrogen-exchanger and containing originally 16° of hardness due to calcium sulfate and 5° of hardness due to chloride (with 275 mg. of SO₄″ and 60 mg. of Cl′ per liter). The filtration was interrupted in each particular case when the filtrate began to be acid (pH about 6). The first filter was exhausted after 70 parts by volume of this water had run through, calculated on one part by volume of exchange-resin. It yielded a filtrate which was free from sulfate but it still contained 20 to 25 mg. per liter of Cl′. The second filter was not exhausted until 80 parts by volume had passed through. Neither SO₄″ nor Cl′ could be detected by analysis in the filtered water. For a 97 per cent. regeneration of the first filter, 15 parts by volume of a normal caustic soda solution were required, whereas in the second case 5 parts by volume were sufficient.

Example 2.—52 parts of meta-phenylene-diamine are dissolved in 38 parts by volume of hydrochloric acid of 32 per cent. strength, and 25 parts by volume of water; the solution is mixed with 70 parts of a solution of 56 per cent. strength of trimethyl - meta - aminophenyl - ammonium chloride hydrochloride, and then cooled to 0° C. To this solution there are added 180 parts of formaldehyde solution of 30 per cent. strength likewise at a temperature of 0° C., and the whole is homogenized by rapid stirring. The mixture solidifies within a minute, when heating to 70° C., to a block resin. This is hardened by heating it for 12 hours in a drying chest to 70° C. and then, after comminution and treatment with caustic soda-solution, is ready for use for anion-exchange. It differs from the ordinary resin made from meta-phenylene-diamine by considerably more rapid exchange and by being still capable of exchange even in neutral and slightly alkaline region.

Comparative samples used in manner similar to that described above yield the following result:

With the normal resin, when filtering, an N-hydrochloric acid chloride was found in the filtrate when 50 per cent. of the total capacity of the filter had been utilized, whereas with the more strongly basic resin, only after about 95 per cent. of the total capacity had been utilized were traces of chloride observed in the filtrate.

Example 3.—In a boiler having a stirrer and a steam jacket, 170 parts by weight of the non-methylated initial resin comminuted to a grain of about 2 mm. size, obtainable as described in Example 1, are suspended in 500 parts of water. After 100 parts of guanidine cyanide have been introduced, the whole is evaporated to dryness while stirring, and the dry mass is heated, while further stirring slowly, for a further 10 to 12 hours. The steam pressure in the steam jacket during this operation amounts to 2 atmospheres. Then the whole is suspended in 500 parts of water, the suspension is heated to 70 to 80° and then filtered with suction and the solid matter washed. After drying in a vacuum at 110 to 120° C. there is obtained a resin which has fully 4 times the capacity of that of the non-methylated resin. Its action will be seen from the following table:

*Non-methylated resin from*

| 1 mol. meta-phenylene-diamine and 2.5 mols. formaldehyde | 1 mol. meta-phenylene-diamine and 1.8 mols. formaldehyde |

*Sulfuric acid absorption (expressed as equivalent quantity of CaO)*

|  | Per cent | Per cent |
| --- | --- | --- |
| Untreated resin | 0.6 | 2 |
| Treated resin | 2.8 | 4.5 |

*Dechlorination of water with 50 mg. of Cl.ion per liter*

There remains in the water

|  | Milligrams | Milligrams |
| --- | --- | --- |
| Untreated resin | 30 | 30 |
| Treated resin | 5 | 4 |

Example 4.—10 parts of the non-methylated resin from meta-phenylene-diamine and formaldehyde, obtainable as described in Example 1 are heated with 10 parts of epichlorhydrin for about 8 hours at 100° C. After cooling, the excess epichlorhydrin is removed and the resin is heated for 8 hours under reflux with a trimethylamine solution of 30 per cent. strength. The resin obtained is washed, dried and comminuted. Its adsorption capacity for anions is now much increased. If water containing calcium sulfate, which first of all has been filtered through a hydrogen-ion-exchanger is allowed to run in parallel over two filters one of which is charged with untreated resin and the other with resin treated by this invention, the first filter will absorb 1.05 per cent. of H₂SO₄ before the first traces of sulfuric acid appear in the filtrate, whereas the latter shows an absorption of 1.75 per cent. of H₂SO₄ before the filtrate is found to contain H₂SO₄.

Water containing sodium chloride filtered in a suitable manner first over a hydrogen-ion-exchanger and which contains 75 mg. of Cl' per liter, is freed from chloride by untreated resin to 30 mg., and by resin obtained according to the invention to 6 mg. Cl' per liter.

*Example 5.*—100 parts of a resin produced as described in Example 1, are treated with the vapor from 35 parts of boiling ethylene-imine for 6 hours, whereby the resin swells strongly. The cooled resin is well washed with methanol and dried. An anion exchanger with increased capacity is obtained.

*Example 6.*—540 parts of meta-phenylenediamine are dissolved in 1200 parts by volume of hydrochloric acid of 16 per cent. strength, and mixed while well stirring with 215 parts of ethylene-imine. The solution attains a temperature of 80° C. After cooling to 0° C., likewise stirring quickly, 1300 parts of formaldehyde (of 30 per cent. strength) are added, whereupon the solution solidifies, while attaining a temperature of about 70° C., to a black resin. The product thus obtained is dried at 100° C. and after comminution, can be used as anion exchanger. Its anion-exchanging property is better than that of the resin produced in the absence of ethylene imine. A measure of its anion-exchanging properties is given by the capacity of the resin for splitting neutral salts. If 1 liter of normal NH₄Cl solution is filtered through 2 filters each charged with 150 grams of a resin prepared without the aid of ethyleneimine and a treated resin prepared as above respectively, in the first case 0.6 gram of NH₃, and in the second case 2.3 grams of NH₃ are liberated.

*Example 7.*—540 parts of meta-phenylene-diamine are heated with 300 parts of N-dimethyl-chlorethylamine hydrochloride for 6 hours in the steam bath. The syrupy mass thus obtained is then taken up with 900 parts of water, and after cooling to 5° C. mixed with 900 parts of formaldehyde (of 30 per cent. strength) while stirring vigorously. The reaction mass attains a temperature of 110° C. while gelatinizing. The gel is broken and then dried at 100° C. in a thin layer for about 10 hours, and finally comminuted. There is obtained an anion exchanger whose properties correspond with those of the exchanger obtainable as described in Example 6.

*Example 8.*—15 parts of a resin produced as described in Example 1, are boiled for 12 hours with 30 parts of water and 3 parts of chlorethylamine hydrochloride (ClCH₂CH₂.NH₂.HCl). During the first 8 hours, a concentrated aqueous solution of 2 parts of NaOH is added in drops. After separation of the solution from resin and drying and comminuting the latter, this resin can be used for exchanging anions. In comparison with untreated resin it liberates 2.5 times the amount of ammonia from ammonium chloride solution.

*Example 9.*—600 parts of meta-phenylene-diamine are heated on the water bath together with 390 parts of N-dimethyl-chlorethylamine for 6 hours and then dissolved in 700 parts of water. While stirring 900 parts of a formaldehyde solution of 30% strength are added at about 5° C. The temperature rises to about 100° C. The resin formed is then separated and dried at 90 to 100° C. Its valuable properties are shown in the accompanying table.

*Example 10.*—100 parts of phenylenediamine are dissolved in 850 parts of concentrated hydrochloric acid and 1200 parts of water. To this solution is added, while cooling, a solution of 200 parts of diguanidyl benzene as obtainable by double decomposition of aminobenzene hydrochloride with dicyandiamide in aqueous solution, simultaneously with 2500 parts of a formaldehyde solution of 30 per cent. strength. The temperature rises and at about 70° C. the mass solidifies to a homogeneous gel which is dried at about 80° and worked up as indicated in the foregoing examples.

*Example 11.*—1100 parts of 1-amino-3-hydroxybenzene and 150 parts of hydrazine hydrate are dissolved in 2500 parts of water and 1250 parts by volume of concentrated hydrochloric acid. The solution is cooled to about 5° C. and then 2000 parts of formaline are added. The temperature rises to 60° C. and the mass solidifies at about 45° C. The resin formed is dried at about 80° C. and worked up as usual.

*Example 12.*—1250 parts of meta-phenylene-diamine and 125 parts of hydrazine hydrate are dissolved in 2800 parts of water and 1350 parts of concentrated hydrochloric acid. When adding at about 10° C. 1000 parts of a formaldehyde solution of 30 per cent. strength, the mixture becomes warm and is cooled again to 10° C. When adding 1600 parts of formaline the mass solidifies, the resin formed is broken, dried and worked up in the usual manner.

In the table following hereafter, we have enumerated a number of the resins which absorb or exchange anions and which according to our invention are characterized by their more strengthened basic character when compared with the resins usually produced by condensation of primary amines with aldehydes. In order to demonstrate the better properties of our new substances we have indicated in this table the capacity of the resins to split neutral salts while binding or absorbing the anions and their available capacity. The splitting of neutral salts under formation of free alkali in the remaining solution was carried out as follows:

150 grams of exchange-resin as obtained in form of the hydrochloride according to the examples given above or in analogy thereto were treated with double normal sodium hydroxide until in the filtrate an anion is no longer detectable. Then they were washed with distilled water until 400 ccm. of the liquid which had been allowed to stand for ¼ hour over the exchanger, did consume less than 1 ccm. of decinormal hydrochloric acid.

The exchanger thus treated was now shaken together with 1000 ccm. of a normal NH₄Cl solution. After 2 and 4 hours respectively, 20 ccm.

of the solution were titrated with decinormal hydrochloric acid in the presence of methyl orange as indicator. The absolute numbers indicated in the third column of the table are milli equivalents of base set free per 100 grams of the exchange resin.

The available capacity was determined as follows: 1000 ccm. of the anion exchanger after being weighed were treated with normal sodium hydroxide until the filtrate was free of anions and then washed with water free of bases until Brillant yellow paper no longer changed its color.

Then per hour 5 liters of water free of earth alkaline bases and containing traces of alkali metal salts and containing furthermore 230 mg. of $SO_4''$ and 60 mg. of $Cl'$ were filtered through the resin. Ths filtrated water at the beginning has the value pH=9 and filtration is continued until the filtrate has the pH value 5 to 5.5. With tests hourly taken the content of $SO_4''$ and $Cl'$ was determined. From the amount of the anions taken up by the resins the available capacity was calculated as milli equivalents per 100 grams of the exchange-resin.

In the table following hereafter in column I the ingredients are indicated which have been used in preparing the resins, column II giving a hint to the example according to which or in analogy to which the resin is prepared. The resins 1 and 16 are known products already suggested as anion-exchangers, they are added for comparison.

For the sake of clarity we use some abbreviations in this table and "meta-diamine resin" is intended to mean the resin obtained by condensing meta-phenylene-diamine with formaldehyde, "aniline resin" the resin as obtainable by condensing aniline with formaldehyde, and "aminophenol resin" is the condensation product of 1-amino-3-hydroxybenzene with formaldehyde.

| | I | II | III | IV |
|---|---|---|---|---|
| | Ingredients used in preparing the resins | Example according or in analogy to which the resin is prepared | Capacity to split neutral salts | Available capacity |
| 1 | Meta-diamine resin | | 25 | 66 |
| 2 | Meta-diamine resin finished in the presence of phenyl-trimethyl-ammonium chloride | 2 | 43 | 114 |
| 3 | Meta-diamine resin finished in the presence of meta-aminophenyl-trimethyl-ammonium chloride | 2 | 90 | |
| 4 | Meta-diamine resin finished in the presence of dimethyl-chlorethylamine-hydrochloride | 9 | 90 | |
| 5 | Meta-diamine resin finished in the presence of dimethyl-aminomethanol | 9 | 60 | |
| 6 | Meta-diamine resin after-treated with dicyandiamide | 3 | 106 | 153 |
| 7 | Meta-diamine resin gel after-treated with dicyandiamide | 3 | 137 | 185 |
| 8 | Meta-diamine resin finished in the presence of biguanidylbenzene | 10 | 90 | |
| 9 | Meta-diamine resin after-treated with chlorethylamine-hydrochloride | 8 | 56 | |
| 10 | Meta-diamine resin after-treated with ethyleneimine | 5 | 67 | 104 |
| 11 | Meta-diamine resin finished in the presence of ethyleneimine | 6 | 95 | |
| 12 | Meta-diamine resin finished in the presence of polyethylenediamine | 2 | 70 | |
| 13 | Meta-diamine resin finished in the presence of triethylenetetramine | 2 | 42 | |
| 14 | Meta-diamine resin finished in the presence of 1-amino-3-biguanidylbenzene | 2 | 84 | 164 |
| 15 | Meta-diamine resin finished in the presence of hydrazine hydrate | 12 | 47 | 146 |
| 16 | Aniline resin | | 5.7 | 15 |
| 17 | Aniline resin after-treated with dicyandiamide | 3 | 98 | |
| 18 | Aniline resin finished in the presence of polyethyleneimine | 2 | 140 | |
| 19 | Aminophenol resin after-treated with dicyandiamide | 3 | 62 | |

It is obvious that our invention is not limited to the foregoing examples or to the specific details given therein. In the examples preferably use is made of resins deriving from 1.3-diaminobenzene, however, as may be seen from the table, resins made from aniline or aminophenol likewise are essentially improved in their capacity to absorb anions or to split neutral salts, if the basic character of the products is strengthened by a suitable treatment before, during or after the formation of resin by condensation with formaldehyde. It is obvious that other aromatic amines, such as the homologous compounds or substitution products of the amines mentioned in the examples, likewise may be used for producing a resin, which serves as basic substance. As condensing agent, generally, formaldehyde is used; here, however, likewise other agents combining a plurality of the basic compounds, such as other aldehydes or products developing an aldehyde, dihalogen compounds, or other equivalents of formaldehyde may be used.

What we claim is:

1. Artificial aromatic amine aldehyde resins derived from an amine of the class consisting of aniline, meta-phenylenediamine and 1-amino-3-hydroxybenzene and containing a radicle which enhances the basicity of the resins selected from the class completely composed of those consisting of nitrogen-linked alkyl radicles, nitrogen-linked aliphatic alkylene-amino radicles, hydrazine radicles, quaternary phenylene-alkyl ammonium radicles and the radicle

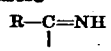

wherein R is a member selected from the group consisting of amino and guanidyl, said resin being insoluble in water and capable of absorbing or exchanging anions, splitting neutral salts which are in a dilute aqueous solution, this capacity to split a salt in the case of a normal $NH_4Cl$ solution corresponding to 40 milli-equivalents of ammonia set free by 100 grams of the free resin base and the available capacity to bind anions being at least 100 milli-equivalents of the anion per 100 grams of the resin.

2. The process for improving the anion exchanging properties of artificial amine resins which comprises carrying out the condensation of an aromatic amine of the group consisting of aniline, metaphenylenediamine and 1-amino-3-hydroxybenzene with formaldehyde in the presence of a phenylalkyl quaternary ammonium compound.

3. The process for improving the anion exchanging properties of artificial amine resins which comprises carrying out the condensation of meta-phenylenediamine with formaldehyde in the presence of a phenylalkyl quaternary ammonium compound.

4. The process for improving the anion exchanging properties of artificial amine resins which comprises carrying out the condensation of metaphenylenediamine with formaldehyde in the presence of phenyl-trimethylammonium chloride.

5. The process for improving the anion exchanging properties of artificial amine resins which comprises carrying out the condensation of meta-phenylenediamine with formaldehyde in the presence of the hydrochloride of meta-amino-phenyltrimethylammonium chloride.

6. The resins defined in claim 1 wherein the aromatic amine is meta-phenylenediamine and the aldehyde is formaldehyde.

7. The process for improving the anion-exchanging properties of artificial aromatic amine resins produced by condensing with an aldehyde an amine of the group consisting of aniline, meta-phenylenediamine and 1-amino-3-hydroxybenzene, which comprises introducing into the resin molecule a radicle capable of enhancing the basicity of the resins and selected from the class completely composed of those consisting of nitrogen-linked alkyl radicles, nitrogen-linked aliphatic alkylene-amino radicles, hydrazine radicles, quaternary phenylene alkyl ammonium radicles and the radicle

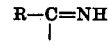

wherein R is a member selected from the group consisting of amino and guanidyl.

ROBERT GRIESSBACH.
HANS WASSENEGGER.
KARL BRODERSEN.
ALFRED RIECHE.
HANS MAIER-BODE.